United States Patent [19]

Pelton

[11] 4,411,679

[45] Oct. 25, 1983

[54] METHOD OF PRODUCING FOAMED CONSTRUCTION MATERIALS

[76] Inventor: Robert S. Pelton, 1400 S. Joyce St., Arlington, Va. 22202

[21] Appl. No.: 346,590

[22] Filed: Feb. 8, 1982

Related U.S. Application Data

[63] Continuation-in-part of Ser. No. 128,887, Mar. 10, 1980, Pat. No. 4,314,835.

[51] Int. Cl.³ .............................................. C03B 19/08
[52] U.S. Cl. ..................... 65/22; 428/312.6; 428/312.8; 428/313.9
[58] Field of Search ............... 428/312.6, 312.8, 313.9; 65/21.4, 22; 106/40 V, 122

[56] References Cited

U.S. PATENT DOCUMENTS

| | | | |
|---|---|---|---|
| 948,541 | 2/1910 | Coleman | 65/22 X |
| 2,187,432 | 1/1940 | Powers | 65/22 X |
| 2,248,717 | 7/1941 | Nash | 65/22 |
| 2,272,930 | 2/1942 | Black | |
| 3,941,182 | 3/1976 | Bjorksten et al. | 164/86 |
| 4,101,704 | 7/1978 | Hiles | 428/313.3 X |
| 4,303,431 | 12/1981 | Torobin | 65/21.4 |

Primary Examiner—Robert L. Lindsay, Jr.
Attorney, Agent, or Firm—Laurence R. Brown

[57] ABSTRACT

A strong, light-weight foamed weight bearing structural member having insulating properties and withstanding atmospheric erosion is formed by introducing a plurality of hollow bodies with shells thereabout into a molten mass of refractory material as a foaming agent and freezing the hollow bodies in place. These shells provide color, strength and texture characteristics to the structural member and may be steered non-uniformly such as near the outer surface to provide toughness, texture, or color, preferably by electrically charging the bodies and establishing an electric field in the molten mass of refractory material.

12 Claims, 12 Drawing Figures

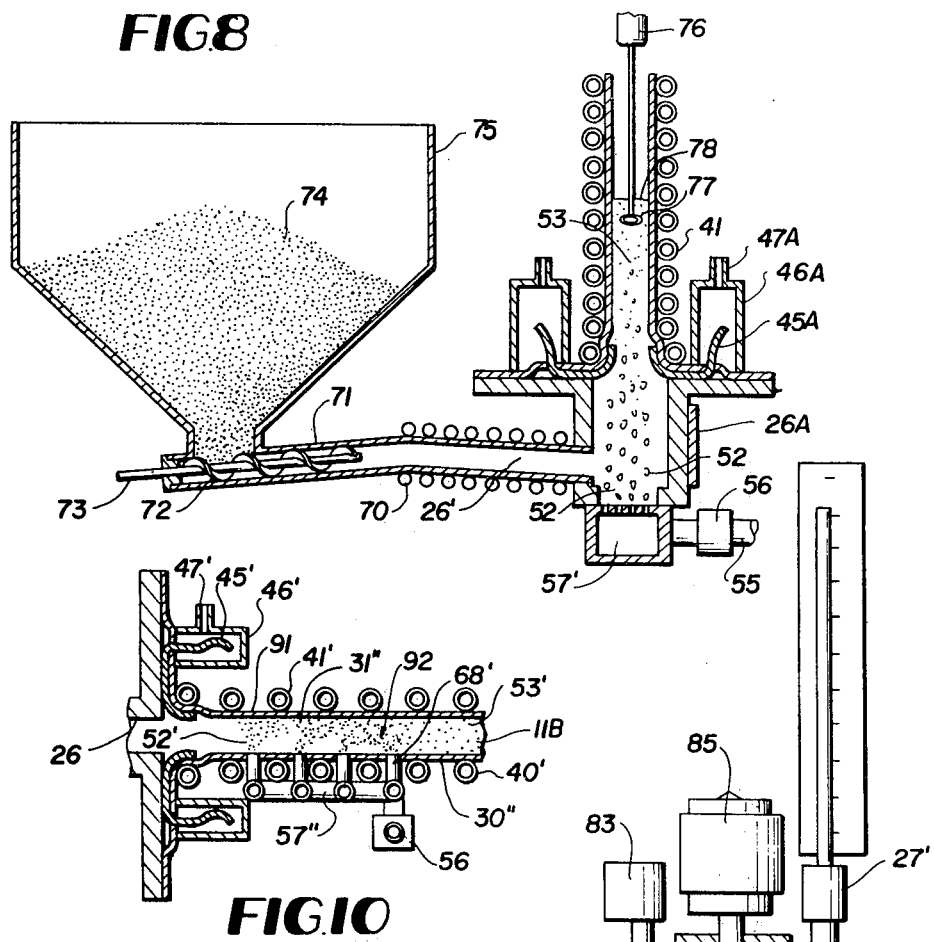
FIG.8
FIG.10
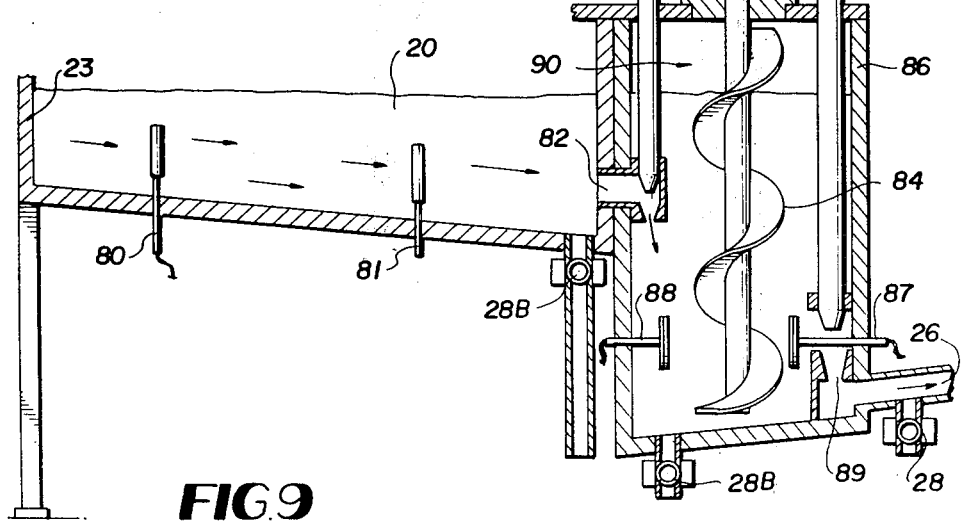
FIG.9

METHOD OF PRODUCING FOAMED CONSTRUCTION MATERIALS

This is a continuation-in-part of my copending application Ser. No. 128,887 filed Mar. 10, 1980, now U.S. Pat. No. 4,314,835 granted Feb. 9, 1982.

TECHNICAL FIELD

This invention relates to a load bearing foam article such as glass construction panels and methods of manufacture thereof including the introduction of gaseous bubbles of controlled size at predetermined rates into molten materials for freezing in place to provide predetermined foam characteristics of uniform cell size and density.

BACKGROUND ART

The art of producing foamed metal, ceramic or glass articles is highly developed. Many and various techniques are available for using foaming agents to produce a continuous output product in the form of a pipe or panel.

U.S. Pat. Nos. representative of this art include:
2,937,938—Fiedler et al.—May 24, 1960;
3,473,904—Kraemer et al.—Oct. 21, 1969;
3,527,587—Velev et al.—Sept. 8, 1970;
3,574,583—Goldsmith—Apr. 13, 1971;
3,607,170—Molesak—Sept. 21, 1971; and
4,124,365—Williams et al.—Nov. 7, 1978.

When the output product is in the form of glass sheets or panels, various skin characteristics and shaping operations can be achieved by tempering processes in the drawing, shaping and cooling operations as represented for example by U.S. Pat. Nos. 4,046,543—Shields—Sept. 6, 1977 and 4,092,141—Frank et al.—May 30, 1978.

Other techniques are known in processing glass or foam which include the agitating of the molten materials and the removal of bubbles from the molten glass before further processing. U.S. Pat. Nos. representative of this art are 3,826,303—Jorema et al.—July 30, 1974; 3,960,532—Lazet—June 1, 1976; and 3,628,937—Schott—Dec. 21, 1971.

The latter patent also provides a method of forming foamed glass panels by introduction of gaseous bubbles into molten glass.

Although such patents as Goldsmith U.S. Pat. No. 3,574,583, above mentioned, recognize the insulating value of foamed glass and glass blocks or bricks are well known as construction materials, there has been a deficiency in the art in producing any long wear glass building material suitable as a building panel that will give life without protective coatings when exposed to atmosphere as glass does and yet have foam light-weight insulating properties. Further building material requirements not found in foamed glass products of the prior art are weight bearing strength, fracture, crack and shatter resistance to impact.

It is therefore a general object of this invention to improve the state of the art by providing versatile foam articles which can be used as long-life load-bearing construction materials suitable for exterior use with insulation properties, and methods of manufacturing such articles.

Further objects, features and advantages of the invention will be found throughout the following description, claims and accompanying drawings.

DISCLOSURE OF THE INVENTION

A foamed article provided by this invention is typically a glass, ceramic or similar metallic foam (refractory material) having a tough tempered poreless skin that resists shattering and cracking and serves as a decorative wall resistant to atmospheric corrosion. The foamed interior provides insulating properties, light-weight and low energy-material cost, and furthermore is constructed to produce bearing weight characteristics and to further resist shattering or cracking into and through the article. The article is characterized by uniformly distributed low density pockets of controlled size and pattern within an outer tempered skin to produce the desired characteristics by means of producing a skeletal structure of poreless material with dispersed random paths surrounding the lower density pockets to prevent any common pathway through the article than can support a fracture line through the article while providing a bearing support strength through the poreless skeletal configuration.

The articles are made by introducing gaseous bubbles or foaming particles of standardized size and controlled frequency into the molten material to be frozen therein as the molten material hardens in the cooling process, while the skin surface is being formed, hardened and tempered preferably in a temperature controlled mold against which the skin surface is sometimes moves continuously. The preferred method of foaming the material is to introduce gaseous bubbles of controlled size and frequency into the bottom of the molten materials to rise therein into a nestled pattern, then hardened. The gas may be of a character that chemically treats the pocket surfaces for strength or other properties and alternatively the gas or other low density pocket may be formed by introduction of controlled size and frequency foaming agents, salts, etc.

The gaseous bubbles are preferably disposed in the refractory material with shells thereabout which confine and control their shape. Thus, for example, preformed micro-spheres may be used to not only produce the desired foaming pattern but also can be of such color or material to produce color, or strength or texture to the structural members formed. Also these bubbles can be strategically located such as by means of electric charges for non-uniformity such as to strengthen or color the material. Thus, the interior body of the material adjacent the skin or exterior surface can be colored or textured by the bubble characteristics, or by other surface treatments.

Other more detailed aspects of the invention will be found throughout the following description.

BRIEF DESCRIPTION OF THE DRAWINGS

In the drawings:

FIG. 8 is an elevation diagrammatic view, partly in section, of a system afforded by this invention for producing foamed panels;

FIG. 9 is an elevation diagrammatic view, partly in section, of a preferred molten material feed system afforded by this invention;

FIG. 10 is an elevation diagrammatic view, partly in section, of an alternative system for forming foamed articles afforded by this invention;

DETAILED DESCRIPTION OF PREFERRED EMBODIMENTS

Figure 1:
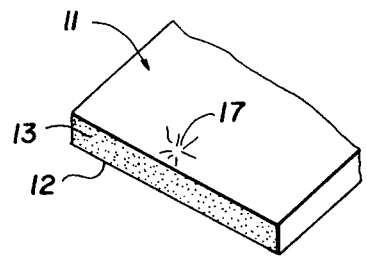
FIG. 1 is a fragment view in perspective of the foamed article provided by this invention in the form of a typical sheet or panel that could be used as a weight bearing construction member.
Figure 2:
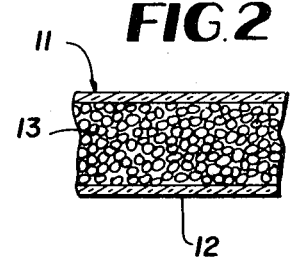
FIGS. 2 and 3 are respective increasing enlargements of portions of the panel of FIG. 1 illustrating the interior low density pocket pattern and surrounding skeletal network of the foamed articles provided by this invention.
Figure 3:
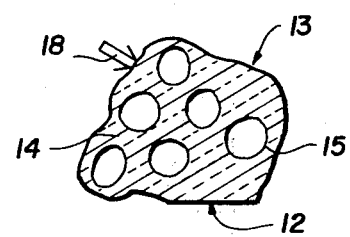

A foamed article such as a construction panel 11 made in accordance with this invention has features shown in FIGS. 1 to 3. A toughened, tempered skin 12 together with a foam 13 interior not only presents an outer surface that is cosmetically good but which withstands deterioration in the weather and environment. The toughened tempered skin 12 and interior integral poreless skeleton structure 14 with interspersed randomly positioned pockets 15 of low density such as gas bubbles provides a structure that will produce a complete load bearing structural modular wall, floor, ceiling and roof section including a decorative textured and/or colored finish ready to assemble into a finished house or building that is maintenance free and requires no paint.

In FIG. 2 the showing of skin 12 is diagrammatical to indicate a tempered tough surface, but as seen in FIG. 3 the solid poreless glass or similar material 14 is integral throughout the panel forming a solid random patterned skeleton of high strength material. A preferred toughened skin thickness obtained by drawing a panel out of a mold over a temperature gradient with the skin in contact with the mold is in the order of 0.4 to 0.7 cm (1/64 inch to ¼ inch) thick. Consider, for example, a force or weight bearing on the panel 11 from an angle shown by arrow 18. This force will be distributed among various paths in three dimensions in the structure through the skeletal structure of poreless material 14 surrounding the low density pockets 15 thus giving an unexpectedly strong bearing weight for a foam product, and will stand impact without fracture or travelling cracks as so common in its family cousin, glass plate. Similarly the forces of a localized impact such as striking with a hammer at 17 will of course fracture and crush the local surface region directly under the hammer which will possibly crush the first two or three layers of bubbles causing a localized face spall and the balance of skeletal material quickly disperses the internal stresses and the bubbles prevent the spreading or growth of crack or shattering and for the same reason offer a substantial degree of resistance to sound penetration. Such impact damage can usually be easily repaired. In order to attain this impact resistant property the article need have a skin of the same material as well as controlled size pockets of substantially uniform generation and/or distribution frequency (although randomly placed individually) to arrange themselves into a well-ordered matrix skeleton. For variations of raw materials insulating qualities, strength, weight, and other product characteristics, the density and bubble size will be varied.

Figure 4:
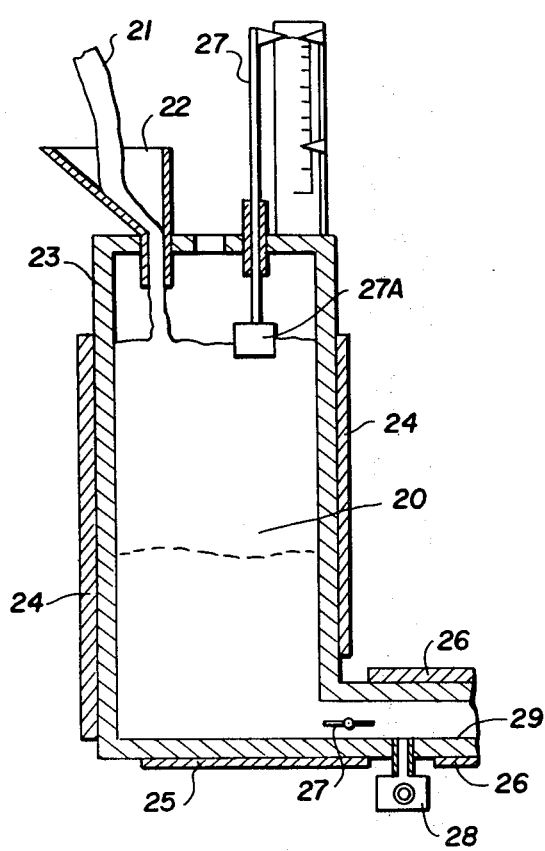
FIG. 4 is a diagrammatic view, in elevation and partly in section, of a reservoir supply of molten materials, used in forming the foamed articles supplied by this invention.
Figure 5:
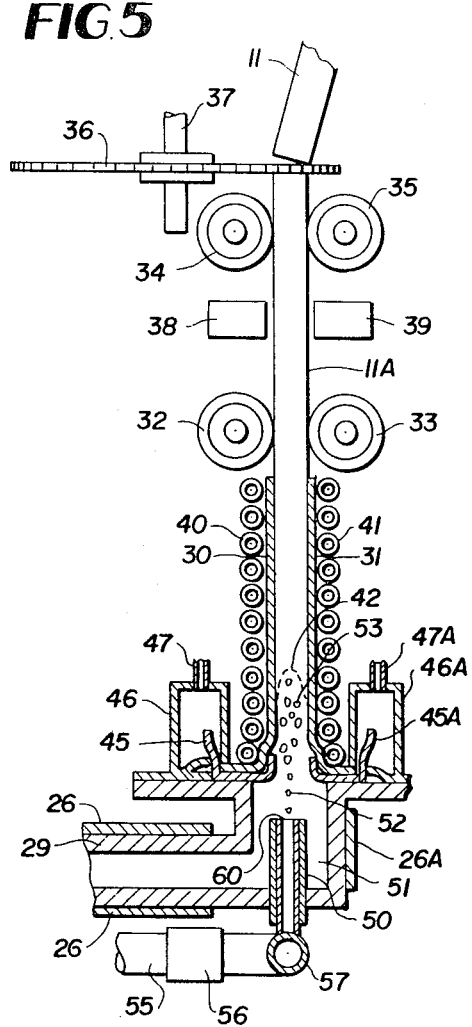
FIG. 5 is a diagrammatic elevation view, partly in section, of a foaming mechanism for producing panels in accordance with this invention.

These articles are made in a preferred manner by the process which is exemplified by the manufacturing equipment of FIGS. 4 and 5. The molten glass reservoir 20 holds the raw materials which are obtained from an external furnace and entered by way of stream 21 through funnel 22. The reservoir may have suitable metallic walls 23 appropriately heated by heaters 24, 25, 26, etc. A level control gage 27 asures an appropriate level of molten material to establish a pressure head and performs other control functions later discussed. The molten material shall typically be referred to as glass, which includes various compositions, slags and chemicals, but could be plastic, metallic or ceramic in nature as for example, aluminum, zinc or the like as shown in U.S. Pat. No. 2,434,775—Sosnick—Jan. 20, 1948. Further desirable controls are the butterfly valve 27 and the drain cock 28 so that flow in the outlet piping conduit 29 can be controlled. While other sources of molten materials may be used, this simple reservoir system can be connected for producing the process afforded by this invention with the configuration shown in FIG. 5 to bottom feed the molten glass into the vertically disposed mold 30, 31 at a head pressure maintained at a level shown on gage 27 an effected by float 27A.

Thus, panels 11 are drawn from the mold 30, 31 by means of rollers 32–35 and cut to proper length by saw 36 rotated on shaft 37. A sonic or X-ray inspection device illustrated by blocks 38, 39 will assure proper density of the throughput materials 11A as they are drawn out of the mold 30, 31 by the follers 32–35 continuously with the surface skin in contact with the inner walls of mold 30, 31. Controlled cooling and tempering is further effected by cooling coils 40, 41 which may be serially connected or form any desired network establishing curing temperature during continuous withdrawal. Thus, the molten materials will harden in a form somewhat as shown by contour 42. To lubricate the mold surface, the asbestos wick structure 45 for example is used with a lubricant reservoir 46 that can be filled at inlet 47.

The manifold 50 protrudes into the molten material mass 51 at the bottom of the mold to eject under careful control bubbles or pellets 52 that rise within the molten material into the hardening region 53 thereby to serve as a foaming agent to convert the molten material into a foam mass in the regions enclosed by the skin which first hardens against the walls of the mold 30, 31 as encouraged by the cooling coils 40, 41.

It is critical that the frequency and size of the foaming gaseous bubbles or pellets be carefully controlled to give the product the desired characteristics hereinbefore set forth. Thus, the manifold 50 is connected to a supply line 55, a pump or feeder device 56 and a dispenser 57 that works into the manifold 50. The manifold may have a nozzle as a dispenser in the case of gaseous bubble foaming agent, or may have a pellet ejecting mechanism in the case of release of a salt or other chemical foaming agent.

The thickness of the skin 13 is determined by the relationship of the temperature of the surface of the mold, die or forming device to the article 11 just before and during the time the article is solidifying. This is also the point in time where the bubbles 52 are moving toward the wall of mold 30, 31. The colder the mold wall forming surface 30, 31 is compared to the article 11, the thicker will be the skin 12. Smoothness of the skin 12 is determined by the smoothness of the forming surface and the type lubricant used, if any.

Bubbles 52 are filled with air or gas or a mixture of gases to serve as the foaming agent. Their size is determined by a number of different variables such as the size of the injecting hole or holes in a nozzle array, the pressure at which air or gas is injected, and the pressure differential between air or gas in the bubble 52 and the molten material 51 before the point of solidifying or crystallization. There are a number of different gases that can be used to form bubbles 52. A preferred one to use is the lightest one that will not unfavorably change the properties of the material forming the article 11. Air is the cheapest and best if all other factors are favorable. However, certain kinds of gas might be preferred to alloy with the material or otherwise to improve the properties of finished product. For example, but not limited to this example, gas might treat the material 14 at the pocket 15 surfaces to make a stronger article, or to make the product have a different coloration.

It is most desirable to have the foaming air or gas as cold as possible. In fact, the colder the better because this has the effect of forming chilled surface around each bubble 52 thus reducing chances of bubbles 52 running together and making larger undesirable pockets 15. It would also help in keeping bubbles 13 the same size and serves to cool the interior of the article 11.

It might be desirable under certain conditions that certain chemicals or their compounds be mixed with molten material 51 before it is foamed or mixed with foaming gas agent to act as catalysts or to improve the properties of the article 11 or to color it. It it is desired these chemicals may be mixed with the air or gas before it is injected into material to be foamed.

It should be understood that method shown and explained is capable of foaming many kinds of materials into many shapes, and each might have many mixing combinations to make different densities. Therefore, it would be impossible to describe exact temperature settings, proportionate rate of mixing, and foam agents to be used for every material.

Heating means and the cooling assembly 26-26A is used to adjust temperature of molten material 51 to just the right temperature so that it will have the correct viscosity for foaming when it is in the mixing chamber adjacent nozzle 60. The cooling assemblies 26 and 26A may thus be formed in two parts: one a cooling coil, and the other an induction heating coil for more precise control. Both of these units are preferably automatically controlled by thermocouples located in the mixing chamber adjacent nozzle 60.

The foaming agent, when a gas or compressed air, enters from tank (not shown) through control assembly 56, into manifold 50, thus into nozzle 60 where it is injected into the molten material 51, thus forming a foamed article 11. Control assembly 56 typically comprises a high speed valve that controls the flow of air. With certain kinds of nozzles 60 it is desirable to make the valve 56 flutter or pulse in order to make the air intermittent, thus assuring formation of bubbles 52 of controlled size in the material 51. If an atomizing nozzle 60 is used, a valve will control flow of air to determine the bubble density or frequency. Control assembly 56 will also have the necessary equipment to cool the air if not precooled.

The vertical process shows one nozzle 60 injecting gas or air bubbles 52 directly into the mixing chamber 29A and centered under the forming cavity or vertical mold structure 30, 31. The forming cavity and mixing chamber is shown in FIG. 5 as a longitudinal cross-sectional drawing. Therefore nozzle 60 as shown in vertical drawing is one of a row of nozzles equally spaced along the center of the mixing chamber. The number of nozzles 60 required is determined by the number required to distribute bubbles evenly across the cross section of the foamed article 11. Nozzles 60 are insulated from wall of mixing chamber and molten material 51 except for the tips where air enters the molten mass.

A different style manifold and nozzle assembly can be used in either a vertical or horizontal molding embodiment, namely, a plate with many small holes or a finely meshed screen permitting gas or air to pass through it into molten mass. The holes in plate or screen are so small and the viscosity of the molten mass is so thick that the molten material will not flow through holes. This plate can be made wider and mounted flush on the bottom of the mixing chamber as in FIG. 8 or bottom side of a horizontal mold arrangement—FIG. 10. For example, it might be an inch wide strip and the length of the mixing chamber and located in the bottom of the mixing chamber. The manifold, in this case, would be a box like structure with one side being the perforated plate or screen. By having pressure in box higher than pressure in mixing chamber the foaming agent will be forced into the molten mass 51 in the mixing chamber, thus forming the foamed product 11. This style of nozzle for injecting foaming agents into mixing chamber may be used to inject gases, liquids or solids. It will work best with gases and liquids, but can be modified to inject solids so they will come through the perforated plate. Another way that powdered foaming agents can be used with this style manifold and nozzle assembly is where the powdered foaming agent is injected into the manifold at one end and heated to a point where the powder gives off a gas which then passes through perforated plate into the mixing chamber. Many of the hydrides, sulfates and carbonates in powder form may be used to foam materials using the manifold and nozzle assembly described above. This, however, makes it more difficult to control the amount of gas generated from the powder.

The critical point in making a foamed material is the point of solidification or crystallization. The beginning of crystallization is in area of wick 45 and at point where bubbles are spread out. In this area and the area just following it the molten mass becomes solidified. Thus the article 11 becomes solid within the first few inches of penetration into the mold cavity 30-31. The length of the solidification area is determined by temperature of the molten mass, the speed of withdrawal of the article 11 and the rate of heat transfer to cooling pipes 40-41.

Similar features are identified by related reference characters throughout the remaining embodiments to facilitate comparison. The underlined characters represent a general feature, lettered notation represents duplicate or alternate features and primed notation represents slightly modified features.

Figure 6:
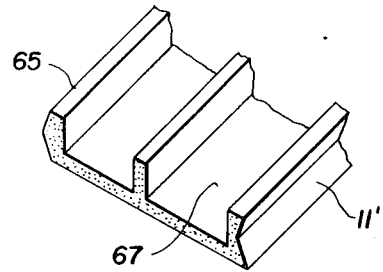
FIG. 6 is a fragment perspective view of a foam construction member having integral offset longitudinal support members made in accordance with the teachings of this invention.
Figure 7:
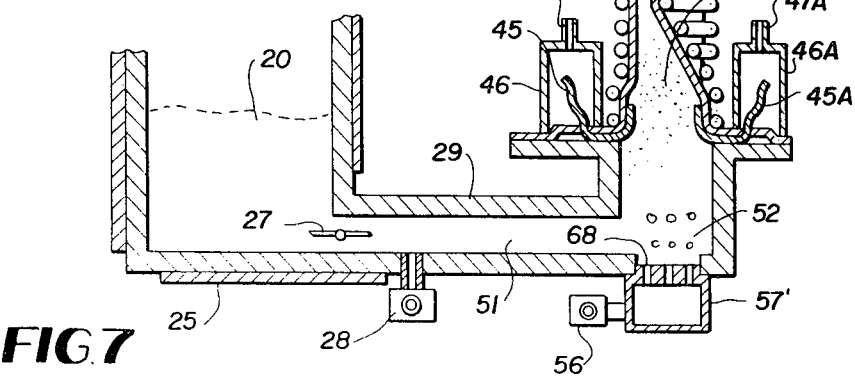
FIG. 7 is a diagrammatic elevation view, partly in section, of a mechanism for forming and foaming the construction member of FIG. 6.

The embodiments of FIGS. 6 and 7 illustrate that the article 11' shape may be varied in a manner helpful to produce construction members capable of bearing weight and useful as modular building materials because of the offset longitudinal rib support members 65 thereon. Other shapes likewise may be made by this continual withdrawal process by modifications to the forming mold structure. This embodiment illustrates that the pocket forming capability works well in a funnel shaped mixing chamber 66 that permits the semi-hardening material to be drawn into the ribs 65 or panel 67 portion of the article 11' to thereby retain the advantages of the material properties in the skin and the skeletal interior. It is noted that the manifold 57' is shown of the type hereinbefore described with a screen 68 on equivalent aperture plate on the bottom of the mixing chamber 66.

The configuration of FIG. 8 shows an embodiment where the molten mass is locally generated by heater coils 70 about the passgeway 26' leading into the mixing chamber. The molten material is kept under a feed pressure as fed into pipe 71 by means of screw feed 72 rotated by shaft 73 to feed granular raw materials 74 from bin 75 into the influence of heating coils 70. Also shown is means for initiating a run of articles shown as a slab 76 similar to a produced panel in thickness with an extending anchor 77 which can be inserted into the molten mass and frozen thereinto to permit withdrawal of the first panel section.

FIG. 9 illustrates means for removing any gases in the molten mass before entry into the mixing chamber through pipe 29. Any unscheduled bubbles or bubbles of uncontrolled size will deteriorate the product. Other methods of degassing such as shown in the aforesaid U.S. Pat. No. 3,960,532 may also be used, if desired.

The molten raw materials 20 are maintained at proper temperature by electrodes 80, 81 and associated energizing circuits preferably temperature controlled from heat sensing thermocouples or the like in the molten materials 20.

The molten materials are passed by channel 82 controlled by gate 83 into the degassing chamber 86. There the agitator 84 turned by motor 85 in a direction carrying the molten materials upward will serve to accumulate all bubbles and gases in the region 90 above the molten materials 20.

The gage 27' controls gate 83 to assure the proper pressure head of the molten mass 20, and the electrodes 87, 88 will keep the molten mass within agitator 86 at the proper temperature for flow out of channel 26 into the article forming mold assembly such as shown in FIG. 5.

The same procedure of foaming the panels can be done with horizontally disposed molds 30", 31" as shown in FIG. 10, where long panels not feasible from a vertical mold are desired, provided that appropriate precautions are taken. Thus, the bubbles 52' need be inserted from the bottom of channel 92 as shown from nozzles 68' extending from manifold 57" along a specified horizontal region so that the bubbles 52' can rise through the molten mass to the position where it is being hardened. Thus, the rightmost nozzles 68' will provide bubbles 52' near the bottom of the article 11B, while the leftmost nozzles 68' will provide bubbles rising to near the top of the article 11B. In this embodiment a skin can be prepared on the upper side only if desired and the foam characteristics can extend to the bottom of the article 11B.

In order to achieve the necessary bubble dispersion and skin characteristics the cooling coils 41' on the top cause the molten material to start hardening near the position 91 where the first nozzle 68' can insert bubbles to raise to a position adjacent the upper skin of the article 11B. Conversely the lower cooling or cooling-heating coils 40' keep the bottom mold member 30" warmer so that hardening does not occur until after the last nozzle 68' on the right. Thus a uniform distribution of the bubbles or other foaming agent occurs through the body of the article 11B even when horizontally moved. It is critical as before explained to have the bubbles or pockets formed of uniform size and frequency to achieve the desired article properties.

It may thus be seen that the process of this invention comprises a method of feeding a molten or liquid material preferably through a storage and degassing container to obtain a relatively even controlled flow into a mixing chamber where it is mixed with a foaming agent in the right proportions to make constant sized bubbles of controlled frequency thus making a light but strong article of special properties, which is then formed into a specific shape and quickly hardened by cooling or curing. If further comprises several methods of preparing to inject and injecting a foaming agent be it gas, liquid or solid. It also includes a method of continuously removing a panel which is continuously inspected so that marked areas can be cut out. The panel is cut into desired lengths while continuously being removed.

It further includes a method of continuously casting a foamed material by means of bottom pouring or bottom injecting of molten or liquid materials, alloying or foaming agents into a mold, die or forming device. It further includes a means of tempering the skin and internally cooling a casting by pre-cooling injected alloying or foaming materials and injecting the alloying or foaming materials as close as possible to the area where the material is to be solidified or crystallized and controlling die temperature.

Figure 11:
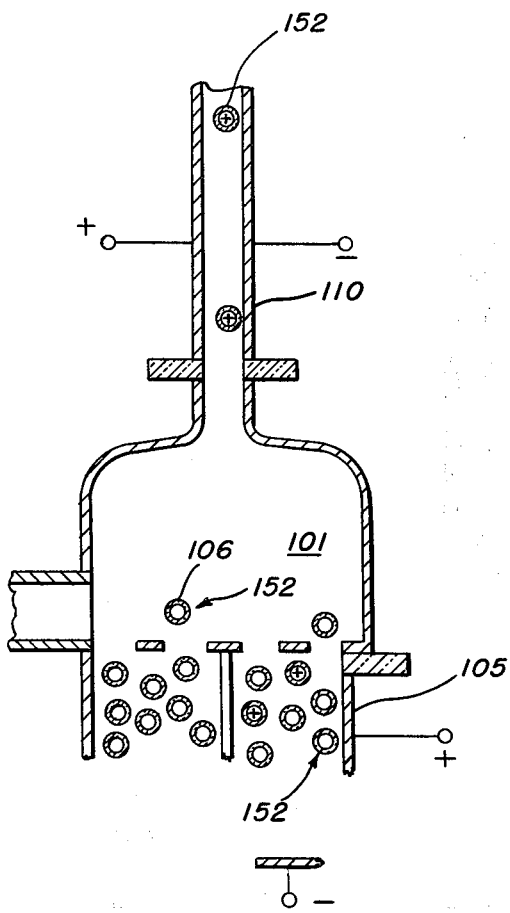
FIG. 11 is a diagrammatic view, partly in section, of an embodiment for steering hollow bodies within the molten mass to preferred locations.

As seen in FIG. 11, the gaseous bubbles inserted as a foaming agent are hollow bodies 152, having shells thereabout for sustaining their shape when injected into the molten mass of refractory material 101. These bubbles may be pre-formed micro-spheres of a glass, refractory material, titanium or the like which has a melting point above that of the molten mass 101. These are readily available at the present state of art. Typically the molten mass 101 can be cooled to a temperature just sufficient to permit migration of the bubbles in the foaming region to thereby make a wider range of shell materials available.

Figure 12:
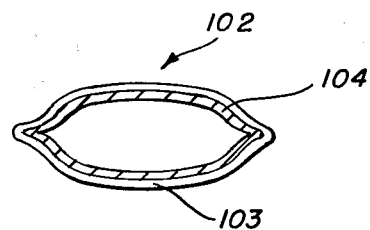
FIG. 12 is a cross section view of a hollow preformed shell body foaming agent embodiment of the invention.

The bubble shells 102 as typified in FIG. 12 need not be spherical but for example could be a cylinder pinched off at both ends. The shape of the shells can be used to provide a texture to the foamed structural membes, particularly if located at or near the exterior surface.

Also, the shells may have a surface coating 103 to produce color or strength by physical or chemical reaction with the molten mass 101 of refractory material. Typically the inner shell 104 could be metallic, steel for strengthening the end product structural member or aluminum anodized as the outer shell 103 for coloring. Alterntively, gas bubbles could be released at various local regions within the molten mass 101 to thereby form a chilled shell in situ of the constituents of the molten mass that first freeze. Similarly the gas itself may be chosen to react with the molten material chemically, such as carbon monoxide for forming carbides. The outer layer 103 also could be a chemical substance reacting either physically upon cooling or chemically with the molten mass refractory material to strenghthen or color the end product. Thus, if tiny bubbles were generated about the shell chemically or physically, a whitening effect is produced. Or a stronger carbide, etc. could be chemically formed in the region about the cell by an appropriate chemical reaction at the temperatures involved.

In order to toughen or color the exterior surface, it may be desirable to concentrate the bubble density there by steering the bubbles into place. Thus, a selective bubble density may become desirable. This is achieved as shown in FIG. 11 by means of electric charges. The pre-formed shells 152, or gas forming bubbles, are ionized by an electrode 105 or corona discharge needle to have a charge, indicated as (+) positive in this embodiment. Preferably with pre-formed bubbles, insulating shells 106 such as high temperature glass or ceramic are used to retain charges. Then by employing an opposite charge of appropriate voltage to establish an electric field in the molten refractory materials as indicated by (−) negative mold plate 110, or the like, the bubbles may be concentrated near the exterior surface for texture, strength or color control.

Novel article and process features believed descriptive of the spirit and nature of this invention are defined with particularity in the claims.

Industrial Application

An article, which may be a panel of foamed glass or similar material, is formed with a skin which does not deteriorate in the environment and with a strengthened internal foam structure which will bear weight so that construction panels and the like can be made with properties which can replace most common construction materials and offering many new features, and further the process can be used to make a wide variety of products.

This article is made in a continuous process from molten glass with appropriate control of the foaming process and with tempering of an outer skin to produce a product which will not shatter or crack upon impact outside the local region of impact.

A single material is provided enabling a complete set of extruded or cast modular parts to be made for the primary structural components for complete houses and buildings. They are strong weight bearing components virtually weather proof. Also they insulate and decorate with integral body or surface color and texture of the material taking on varied appearances.

I claim:

1. The method of making a strong, light-weight weight-bearing structural member with insulating properties having integrally formed exterior surface structure withstanding atmospheric erosion, comprising the steps of,
   melting a mass of a refractory material in the group consisting of glass, plastic, ceramic, aluminum and zinc,
   introducing into the molten mass a plurality of hollow bodies having shells formed of materials having a melting point higher than that of the molten mass in the group consisting of glass refractory material and titanium thereabout that sustain their shape in the molten mass to form thereby a foamed light-weight product comprising an intermixture of the refractory material and the hollow bodies, and
   forming said molten mass into a frozen structural member of predetermined shape.

2. The metod defined in claim 1 including the further steps of electrically charging the hollow bodies, and positioning the bodies in said molten mass by means of the electric charges.

3. The method defined in claim 1 including the step of increasing the structural strength of said structural member by means of a predetermined shell material presenting an interface with the refractory material that presents a structural strength greater than that of the refractory material.

4. The method defined in claim 3 wherein the shell has chemical properties that interact with the refractory material to increase the structural strength.

5. The method defined in claim 3 wherein the shell has a structural strength greater than that of the refractory material.

6. The method defined in claim 1 including the step of steering the hollow bodies to predetermined positions in said structural member.

7. The method defined in claim 6 including the step of steering hollow bodies to a position near the surface of the structural member to modify the characteristic properties of the refractory material thereat.

8. The method defined in claim 7 including the step of providing shells of predetermined color characteristics to provide a surface coloring to the structural member.

9. The method defined in claim 7 including the step of providing shells of predetermined texture to provide a surface texture characteristic to the structural member.

10. The method defined in claim 7 including the step of providing shells of predetermined structural qualities to produce an increased surface strength to the structural member.

11. The method defined in claim 1 including the step of forming the shells by reacting a gaseous substance with the refractory material.

12. The method defined in claim 1 including the step of pre-forming the shells before introduction into said molten mass.

* * * * *